United States Patent
Kim et al.

(10) Patent No.: US 9,715,290 B2
(45) Date of Patent: Jul. 25, 2017

(54) SLIM TYPE TOUCH PANEL AND MOBILE TERMINAL INCLUDING THE SAME

(75) Inventors: Dong Sub Kim, Suwon-si (KR); Hak Yeol Kim, Hwaseong-si (KR); Hoon Do Heo, Suwon-si (KR); Jin Goo Kang, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 627 days.

(21) Appl. No.: 13/268,261

(22) Filed: Oct. 7, 2011

(65) Prior Publication Data
US 2012/0086669 A1    Apr. 12, 2012

(30) Foreign Application Priority Data

Oct. 8, 2010    (KR) .................. 10-2010-0098451

(51) Int. Cl.
  *G06F 3/045*    (2006.01)
  *G06F 3/041*    (2006.01)
  *G06F 3/044*    (2006.01)

(52) U.S. Cl.
  CPC ............ *G06F 3/0412* (2013.01); *G06F 3/044* (2013.01)

(58) Field of Classification Search
  CPC .................. G06F 3/044; G06F 3/0412; G06F 2203/04112
  See application file for complete search history.

(56) References Cited

U.S. PATENT DOCUMENTS

| 5,379,233 | A | * | 1/1995 | Tripathi ............ H01L 21/76816 257/773 |
| 6,380,930 | B1 | | 4/2002 | Van Ruymbeke |
| 8,743,078 | B2 | * | 6/2014 | Kim ............................. 345/174 |
| 2002/0185981 | A1 | | 12/2002 | Dietz et al. |
| 2003/0006971 | A1 | | 1/2003 | Blanchard |
| 2005/0030048 | A1 | * | 2/2005 | Bolender et al. ............ 324/661 |
| 2007/0262962 | A1 | * | 11/2007 | XiaoPing et al. ............ 345/173 |
| 2008/0165139 | A1 | * | 7/2008 | Hotelling ................ G06F 3/041 345/173 |
| 2008/0165158 | A1 | | 7/2008 | Hotelling et al. |
| 2008/0277259 | A1 | * | 11/2008 | Chang .......................... 200/600 |
| 2009/0002337 | A1 | * | 1/2009 | Chang ..................... G06F 3/044 345/174 |
| 2009/0020756 | A1 | * | 1/2009 | Lee ......................... H01L 22/34 257/48 |

(Continued)

FOREIGN PATENT DOCUMENTS

| CN | 101620486 A | 1/2010 |
| JP | 8-213818 A | 8/1996 |

(Continued)

*Primary Examiner* — Amare Mengistu
*Assistant Examiner* — Crystal A Mathews
(74) *Attorney, Agent, or Firm* — Jefferson IP Law, LLP

(57) ABSTRACT

A slim type touch panel is provided. The slim type touch panel includes an upper substrate, a first sensor electrode layer disposed at a lower part of the upper substrate, an insulating film disposed at a lower part of the first sensor electrode layer, and a second sensor electrode layer disposed at a lower part of the insulating film, or includes a first sensor electrode cover sheet in which a sensor electrode layer is patterned, a first adhesive layer disposed at a lower part of the first sensor electrode cover sheet, and a film layer disposed at a lower part of the first adhesive layer and comprising a second sensor electrode layer.

11 Claims, 10 Drawing Sheets

(56) References Cited

U.S. PATENT DOCUMENTS

| | | | |
|---|---|---|---|
| 2009/0109181 A1* | 4/2009 | Hui et al. | 345/173 |
| 2009/0146970 A1* | 6/2009 | Lowles et al. | 345/174 |
| 2009/0213090 A1* | 8/2009 | Mamba et al. | 345/174 |
| 2009/0242283 A1* | 10/2009 | Chiu | G06F 3/044 178/20.01 |
| 2009/0315854 A1* | 12/2009 | Matsuo | 345/174 |
| 2009/0322709 A1 | 12/2009 | Lee et al. | |
| 2010/0001969 A1 | 1/2010 | Saito et al. | |
| 2010/0007616 A1 | 1/2010 | Jang | |
| 2010/0007621 A1* | 1/2010 | Kang et al. | 345/173 |
| 2010/0013745 A1* | 1/2010 | Kim et al. | 345/76 |
| 2010/0045625 A1* | 2/2010 | Yang et al. | 345/173 |
| 2010/0110016 A1* | 5/2010 | Ladouceur et al. | 345/173 |
| 2010/0182253 A1* | 7/2010 | Park et al. | 345/173 |
| 2010/0182257 A1 | 7/2010 | Kang et al. | |
| 2010/0265197 A1* | 10/2010 | Purdy et al. | 345/173 |
| 2010/0265208 A1 | 10/2010 | Kim et al. | |
| 2010/0309160 A1* | 12/2010 | Lin | 345/174 |
| 2010/0321308 A1* | 12/2010 | Lin et al. | 345/173 |
| 2011/0050648 A1* | 3/2011 | Lee et al. | 345/175 |
| 2011/0151937 A1* | 6/2011 | Kusuda | G06F 1/1626 455/566 |
| 2011/0261003 A1* | 10/2011 | Lee et al. | 345/174 |
| 2012/0044187 A1* | 2/2012 | Polishchuk | G06F 3/044 345/174 |
| 2012/0050177 A1* | 3/2012 | Simmons | G06F 1/1641 345/173 |
| 2014/0267159 A1* | 9/2014 | Miyazaki et al. | 345/174 |

FOREIGN PATENT DOCUMENTS

| | | |
|---|---|---|
| JP | 2002-215330 A | 8/2002 |
| JP | 2002-539517 A | 11/2002 |
| JP | 2003-280815 A | 10/2003 |
| JP | 2004-005516 A | 1/2004 |
| JP | 2008-152806 A | 7/2008 |
| JP | 2009-211372 A | 9/2009 |
| JP | 2010-015412 A | 1/2010 |
| JP | 2010-515969 A | 5/2010 |
| JP | 2010-122951 A | 6/2010 |
| JP | 3160091 U | 6/2010 |
| JP | 2010-164929 A | 7/2010 |
| JP | 2010-191287 A | 9/2010 |
| KR | 10-2005-0122986 A | 12/2005 |
| KR | 10-2008-0102446 A | 11/2008 |
| KR | 10-0870229 B1 | 11/2008 |
| KR | 10-2009-0041786 A | 4/2009 |
| KR | 10-2010-0010019 A | 1/2010 |
| KR | 10-2010-0019582 A | 2/2010 |
| KR | 10-0951136 B1 | 4/2010 |
| KR | 10-2010-0093204 A | 8/2010 |
| WO | 2009/054561 A1 | 4/2009 |

* cited by examiner

SLIM TYPE TOUCH PANEL AND MOBILE TERMINAL INCLUDING THE SAME

PRIORITY

This application claims the benefit under 35 U.S.C. §119(a) of a Korean patent application filed on Oct. 8, 2010 in the Korean Intellectual Property Office and assigned Serial No. 10-2010-0098451, the entire disclosure of which is hereby incorporated by reference.

BACKGROUND OF THE INVENTION

1. Field of the Invention

The present invention relates to a touch panel. More particularly, the present invention relates to a slim type touch panel and a mobile terminal including the same that improve a transmittance while reducing a thickness of a touch panel of a capacitive method.

2. Description of the Related Art

Mobile terminals provide a communication function based on mobility and are widely used due to their convenience and easy portability. In order to provide a user function, the mobile terminal provides various input methods. For example, a conventional mobile terminal provides a touch screen including a touch panel and a display unit and thus a user can select a specific image for output to the display unit in the touch panel. The mobile terminal generates a touch event according to a corresponding user action and controls an application program corresponding to a user function based on the touch event.

In a touch panel that uses a capacitive method, film layers having two sensor electrode layers (i.e., an X sensor electrode layer and a Y sensor electrode layer) are disposed in an upper part of a display panel, and in an upper part of the film layers, a cover sheet for covering the film layers including each sensor electrode layer is provided. Accordingly, the conventional touch panel has an increased thickness due to film layers and thus has a problem in providing a slim mobile terminal. Further, because the film layers are disposed at an upper part of the display panel, a structural air gap is formed between the display panel and the touch panel and thus an optical characteristic is deteriorated.

SUMMARY OF THE INVENTION

Aspects of the present invention are to address at least the above-mentioned problems and/or disadvantages and to provide at least the advantages described below. Accordingly, an aspect of the present invention is to provide a slim type touch panel and a mobile terminal including the same that can provide a mobile terminal having a small thickness.

Another aspect of the present invention is to provide a slim type touch panel and a mobile terminal including the same that can provide an improved optical characteristic by preventing an air layer from forming between a display panel and a touch panel.

In accordance with an aspect of the present invention, a mobile terminal including a slim type touch panel is provided. The mobile terminal includes a cover sheet in which a plurality of sensor electrode layers are patterned, an adhesive layer disposed at a lower part of the cover sheet, and a display panel disposed at a lower part of the adhesive layer.

In accordance with another aspect of the present invention, a mobile terminal including a slim type touch panel is provided. The mobile terminal includes a first sensor electrode cover sheet in which a sensor electrode layer is patterned, a first adhesive layer disposed at a lower part of the first sensor electrode cover sheet, a film layer disposed at a lower part of the first adhesive layer and comprising a second sensor electrode layer, a second adhesive layer disposed at a lower part of the film layer, and a display panel disposed at a lower part of the second adhesive layer.

In accordance with yet another aspect of the present invention, a slim type touch panel is provided. The slim type touch panel includes an upper substrate, a first sensor electrode layer disposed at a lower part of the upper substrate, an insulating film disposed at a lower part of the first sensor electrode layer, and a second sensor electrode layer disposed at a lower part of the insulating film.

In accordance with still another aspect of the present invention, a slim type touch panel is provided. The slim type touch panel includes a first sensor electrode cover sheet in which a sensor electrode layer is patterned, a first adhesive layer disposed at a lower part of the first sensor electrode cover sheet, and a film layer disposed at a lower part of the first adhesive layer and comprising a second sensor electrode layer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
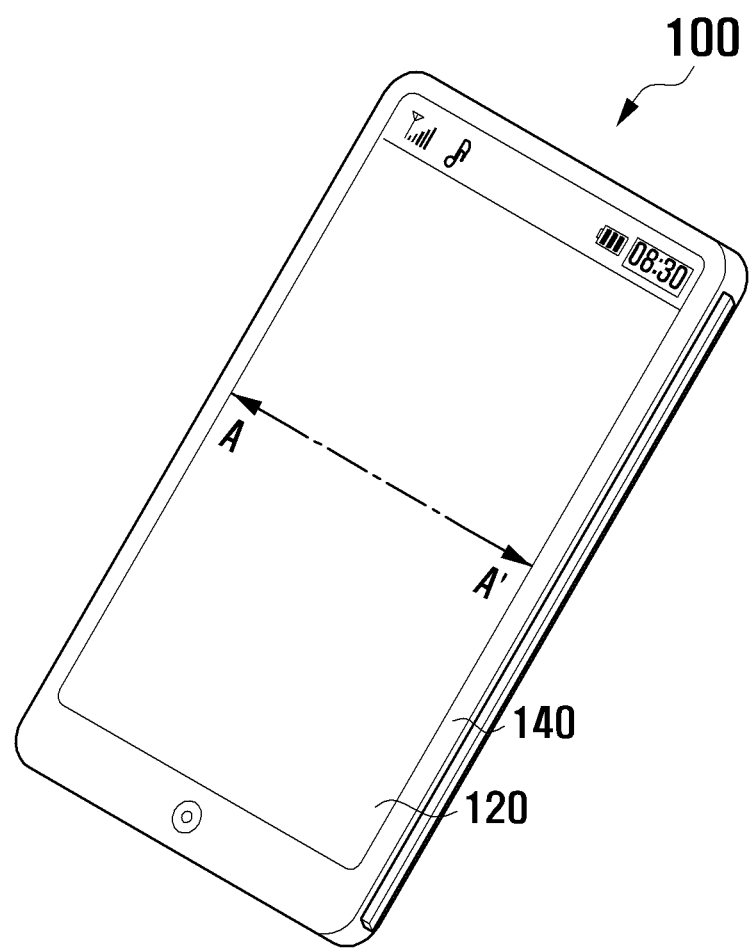
FIG. 1 is a perspective view illustrating an external appearance of a mobile terminal having a slim type touch panel according to an exemplary embodiment of the present invention.

FIG. 1 is a perspective view illustrating an external appearance of a mobile terminal having a slim type touch panel according to an exemplary embodiment of the present invention.

Referring to FIG. 1, a mobile terminal 100 has a structure in which a touch panel 140 is disposed at a front surface and in which a display panel 120 is disposed at a lower part of the touch panel 140. The mobile terminal 100 sets an effective touch area of the touch panel 140 according to an image output to the display panel 120 and generates a specific input signal matched to an image output to the display panel 120 according to a position of a touch event occurring in the touch panel 140. In the present exemplary embodiment, the touch panel 140 is formed as a panel using a capacitive method. That is, the touch panel 140 has two sensor electrode layers, and each sensor electrode layer is disposed at a predetermined gap there between. More particularly, at least one of the two sensor electrode layers is formed in a pattern on a cover sheet constituting the touch panel 140. Accordingly, the touch panel 140 removes a film layer necessary for forming two sensor electrode layers and thus the slim touch panel 140 having a reduced thickness is provided, thereby improving an optical characteristic. An adhesive layer is provided between the touch panel 140 and the display panel 120. In this case, the adhesive layer is formed with an intermediary material having excellent visibility, for example, Optically Clear Adhesive (OCA), Super View Resin (SVR), and the like, thereby removing an air layer that may be generated between the touch panel 140 and the display panel 120 and thus minimizes a light reflectivity and optimizes an optical characteristic. Further, the adhesive layer may be provided in a liquid form, but may be formed in a solid form such as a transparent epoxy adhesive or a hot-melt adhesive. If a solid adhesive is used, a production process includes coating an adhesive material, applying a predetermined heat, and curing the solid adhesive such that the solid adhesive provides a more solid adhesive function.

A structure of the slim type touch panel 140 according to an exemplary embodiment is described in more detail with reference to FIG. 2.

Figure 2:
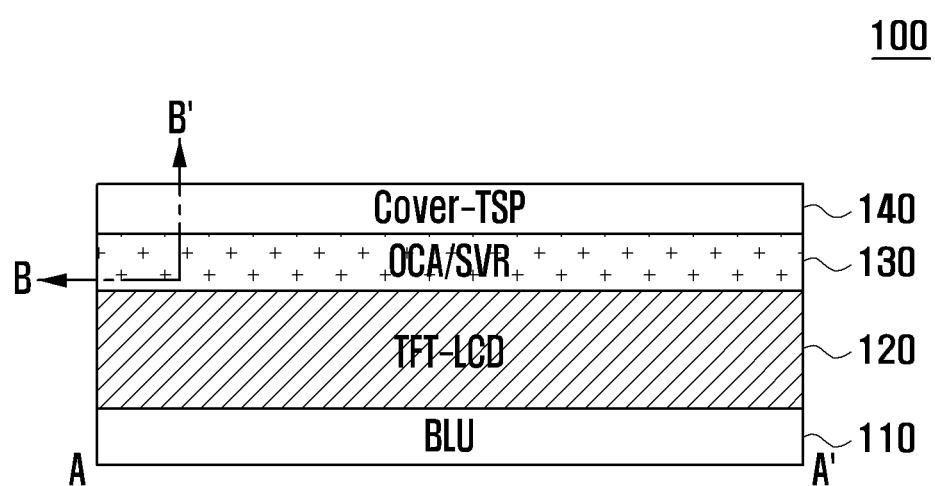
FIG. 2 is a cross-sectional view illustrating a slim type touch panel structure of the mobile terminal taken along line A-A' of FIG. 1 according to an exemplary embodiment of the present invention.

FIG. 2 is a cross-sectional view illustrating a slim type touch panel structure of the mobile terminal taken along line A-A' of FIG. 1 according to an exemplary embodiment of the present invention.

In the following description of FIG. 2, the slim type touch panel 140 is referred to as a cover sheet for a characteristic of an applied touch panel.

Referring to FIG. 2, the mobile terminal 100 performs a function of a capacitance sensor of a touch screen and has a structure including a cover sheet (cover-TSP) 140 formed with a transparent material, an adhesive layer OCA/SVR 130, a display panel 120, and a BackLight Unit (BLU) 110. In an exemplary implementation, the display panel 120 may include a Thin Film Transistor-Liquid Crystal Display (TFT-LCD) panel.

The cover sheet 140 in which the sensor electrode layers are patterned is adhered to the adhesive layer 130 provided in an upper layer of the display panel 120 and outputs a capacitance change according to a user's touch based on the sensor electrode layers to a controller of the mobile terminal 100 through a signal line connected to the cover sheet 140. The cover sheet 140 includes sensor electrode layers formed in a pattern on a cover sheet provided to cover the display panel 120. A more detailed structure of the cover sheet 140 is described later with reference to FIG. 3.

The adhesive layer 130 is formed with a double-sided tape and is disposed between the cover sheet 140 and the display panel 120 to perform a function of fixing the cover sheet 140 on the display panel 120. The adhesive layer 130 is formed with an SVR material or an OCA material having excellent transmittance and adhesive strength. As described above, after being provided in a solid type, the adhesive layer 130 may be cured through thermosetting.

The display panel 120 outputs a specific image by the control of the controller of the mobile terminal 100. The display panel 120 may be formed with panels of various forms and may be formed with a flat display element such as an LCD and an Organic Light Emitting Diode (OLED). For example, the display panel 120 may be formed with a Plane Line Switching (PLS) type LCD. In an exemplary implementation as described below, a TFT-LCD applied as the display panel 120 is described. When the display panel 120 is formed as an LCD, a lower substrate and an upper substrate are provided in the display panel 120, an electrode layer is formed on the lower substrate, and a color filter layer is provided on the upper substrate. Here, a liquid crystal layer is provided between the lower substrate and the upper substrate, and the electrode layer includes the TFT and signal lines for driving the TFT. The electrode layer activates a specific TFT according to a signal that is output through the signal lines and activates the liquid crystal layer according to an electric field formed with a common electrode separately provided from a pixel electrode connected to the activated TFT. That is, in the liquid crystal layer, liquid crystals of a field anisotropic material having a molecular structure that is changed in a specific direction according to an electric field of the electrode layer are disposed. The color filter layer emits light of a predetermined color, for example a Red, Green, Blue (RGB) color by light radiated from the backlight unit 110. Here, the display panel 120 is formed in a structure of generating a predetermined electric field together with the electrode layer by providing a common electrode in an upper part of the liquid crystal layer, or may be formed in a structure of generating a predetermined electric field by providing a common electrode in an electrode layer, as in the PLS type. In the display panel 120, the adhesive layer 130 is provided in an upper part of the upper substrate, and the display panel 120 performs a function of fixing the cover sheet 140 adhered to the adhesive layer 130.

When the display panel 120 is an LCD type, the backlight unit 110 is provided. That is, because the LCD type has no self light emitting source, the LCD type mobile terminal 100 requests a process of guiding light generated in the backlight unit 110 and radiating the light in a direction of the display panel 120. The backlight unit 110 is classified into an edge type or a flat panel type according to a disposition position of a lamp for performing a function of a light source. The backlight unit 110 includes a light guide plate for guiding light radiated from a light source and at least one optical sheet for improving efficiency of light transmitting the light guide plate and further includes a reflector for increasing light reflection efficiency of the light source. When the mobile terminal 100 is an OLED having a self light emitting light source, the backlight unit 110 may be removed from the mobile terminal 100.

As described above, the cover sheet 140 according to an exemplary embodiment of the present invention does not include separate Indium Tin Oxide (ITO) films in which a sensor electrode layer is formed and forms sensor electrode layers as a pattern on a cover sheet, thereby forming a capacitance touch sensor. Here, the ITO film layer has a structure of forming an ITO thin film as a pattern on a PolyEthylene Terephthalate (PET) film. Accordingly, the cover sheet 140 according to the present exemplary embodiment provides a structure relatively thinner than a structure to which ITO film layers are applied. The cover sheet 140 according to the present exemplary embodiment can reduce light characteristic degradation occurring in a light transmittance process by stacking ITO film layers. A more detailed structure of the cover sheet 140 is described with reference to FIG. 3.

Figure 3:
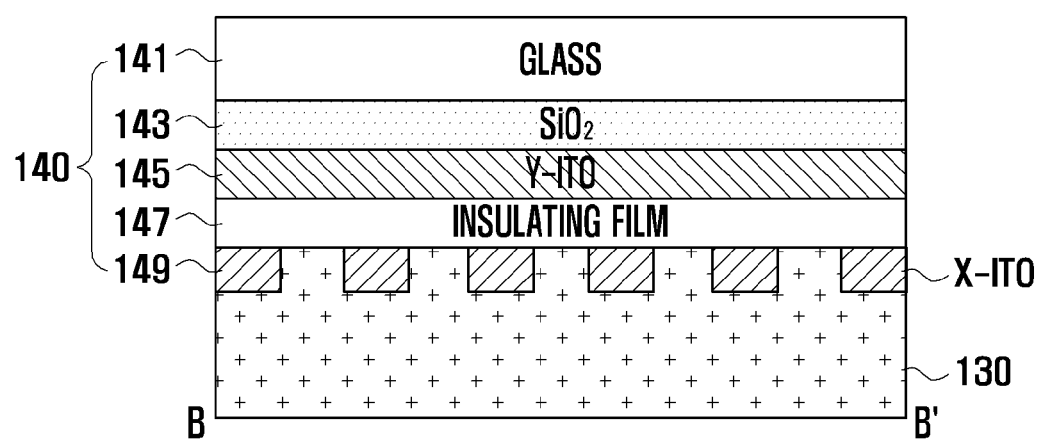
FIG. 3 is a cross-sectional view illustrating the touch panel structure taken along line B-B' of FIG. 2 according to an exemplary embodiment of the present invention.

FIG. 3 is a cross-sectional view illustrating the touch panel structure taken along line B-B' of FIG. 2 according to an exemplary embodiment of the present invention.

Referring to FIG. 3, the cover sheet 140 includes an upper substrate (GLASS) 141, an insulating layer ($SiO_2$) 143, a first sensor electrode layer (Y-ITO) 145, an insulating film 147, and a second sensor electrode layer (X-ITO) 149. The adhesive layer 130 is disposed at a lower part of the cover sheet 140.

The upper substrate 141 is formed with Poly Carbonate (PC) of a transparent material, for example a glass material or a plastic material. More particularly, tempered glass reinforced with glass of a predetermined characteristic is applied to the upper substrate 141. The upper substrate 141 performs a function of a substrate in which sensor electrode layers for performing a function of the capacitance sensor are formed.

The insulating layer 143 protects a surface of the upper substrate 141 while sustaining visibility of the display panel 120. For this purpose, the insulating layer 143 is formed with transparent porous $SiO_2$. In order to improve a characteristic of the upper substrate 141 and light transmittance, the insulating layer 143 may be omitted. That is, the insulating layer 143 is removed and the first sensor electrode layer 145 may be directly formed on the upper substrate 141.

The first sensor electrode layer 145 is formed by a patterning operation on a surface of the upper substrate 141 or on the insulating layer 143. In order to sustain visibility of the display panel 120, the first sensor electrode layer 145 is formed with an electrode of a transparent material, for example, ITO. The first sensor electrode layer 145 formed with ITO forms a sensor electrode pattern through a process of ITO application and etching. More particularly, in order to more efficiently detect a capacitance change with a capacitive method, the first sensor electrode layer 145 is used as a Y electrode. Here, the Y electrode may output a signal of a change of electric charges distributed in a gap formed between the first sensor electrode layer 145 and the second sensor electrode layer 149.

The insulating film 147 prevents a short circuit between the first sensor electrode layer 145 and the second sensor electrode layer 149. The insulating film 147 is formed with various inorganic materials. More particularly, in order to improve visibility of the display panel 120, the insulating film 147 is formed with various materials such as $SiO_2$, $TiO_2$, and PolyMethyl MethAcrylate (PMMA) of a transparent material.

The second sensor electrode layer 149 is formed on the insulating film 147 and has a predetermined gap from the first sensor electrode layer 145. After being disposed to have a gap from the first sensor electrode layer 145, the second sensor electrode layer 149 enables the cover sheet 140 to operate as a capacitance touch sensor based on electric charges supplied by the mobile terminal 100. In order to sustain visibility of the display panel 120, similarly to the first sensor electrode layer 145, the second sensor electrode layer 149 is formed with ITO, which is a transparent electrode material. The second sensor electrode layer 149 performs a function of an X electrode, unlike the first sensor electrode layer 145. In order to detect a capacitance change, the X electrode may be a charge input electrode for supplying electric charges.

In a process of manufacturing the cover sheet 140, after the second sensor electrode layer 149 is formed, in order to prevent scattering of the second sensor electrode layer 149 and to protect an electrode, while performing a laminating process, a transparent protective layer is formed in a lower part of the second sensor electrode layer 149. In this case, because the adhesive layer 130 is disposed at a lower part of the transparent protective layer through a separate process, the adhesive layer 130 is excluded from a configuration of the cover sheet 140 to be classified as a separate element. In the laminating process, the adhesive layer 130 may cover the second sensor electrode layer 149 by replacing a transparent protective layer instead of forming the transparent protective layer. Therefore, when the adhesive layer 130 is formed to directly cover the second sensor electrode layer 149 without a process of forming a separate transparent protective layer in a laminating process according to a manufacturing method of the cover sheet 140, the adhesive layer 130 may be classified as an element of the cover sheet 140. As a result, the cover sheet 140 may be manufactured as an integral form including the upper substrate 141, the first sensor electrode layer 145, the insulating film 147, the second sensor electrode layer 149, and the transparent protective layer, or as an integral form including the upper substrate 141, the first sensor electrode layer 145, the insulating film 147, the second sensor electrode layer 149, and the adhesive layer 130, according to a manufacturing method. In the cover sheet 140, the insulating layer 143 may be selectively formed or omitted according to a manufacturing process, as described above.

As described above, the slim type touch panel 140 according to an exemplary embodiment of the present invention is formed by directly patterning the first sensor electrode layer 145 and the second sensor electrode layer 149 on the upper substrate 141. Accordingly, because an ITO film layer for forming a separate sensor electrode layer is not included, the slim type touch panel 140 of a smaller thickness can be provided. Further, as shown, because a separate film layer is not included and a pattern of a material having high visibility and transmittance is used, an optical characteristic of the touch panel 140 can be optimized. Additionally, after the adhesive layer 130 is formed to cover the second sensor electrode layer 149 of the touch panel 140, by attaching the adhesive layer 130 to a front surface of the display panel 120, an air layer that may occur between the touch panel 140 and the display panel 120 can be removed. Accordingly, the mobile terminal 100 according to the present exemplary embodiment can provide higher visibility by removing light reflection that may occur between the touch panel 140 and the display panel 120.

Figure 4:
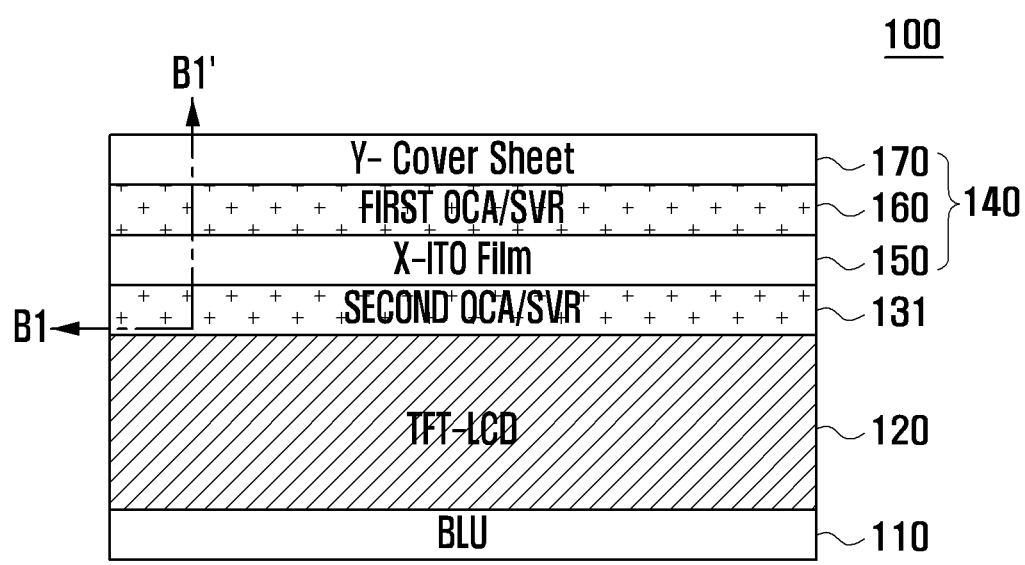
FIG. 4 is a cross-sectional view illustrating a slim type touch panel structure of the mobile terminal according to another exemplary embodiment of the present invention taken along line A-A' of FIG. 1.

FIG. 4 is a cross-sectional view illustrating a slim type touch panel structure of the mobile terminal according to another exemplary embodiment of the present invention taken along line A-A' of FIG. 1.

Referring to FIG. 4, the mobile terminal 100 has a structure including a first sensor electrode cover sheet (Y-cover sheet) 170, a first adhesive layer (first OCA/SVR) 160, a film layer (X-ITO Film) 150, a second adhesive layer (OCA/SVR) 131, a display panel (TFT-LCD) 120, and a BLU 110.

A configuration of the display panel 120 and the backlight unit 110 is similar to that of the display panel 120 and the backlight unit 110 of FIG. 3 and therefore a detailed description thereof is omitted.

The first sensor electrode cover sheet 170 is disposed at an upper part of the first adhesive layer 160 and the film layer 150 and outputs a signal according to a capacitance change by a user's touch based on a gap from a sensor electrode layer formed in the film layer 150 to a controller of the mobile terminal 100. Here, in the first sensor electrode cover sheet 170, the first sensor electrode layer is formed, and signal lines for connecting the first sensor electrode layer and the controller may be further provided. A more detailed structure of the first sensor electrode cover sheet 170 is described with reference to FIG. 5.

The first adhesive layer 160 is disposed between the first sensor electrode cover sheet 170 and the film layer 150 to perform a function of fixing the first sensor electrode cover sheet 170 and the film layer 150. Further, the first adhesive layer 160 performs a function of preventing a short circuit of a first sensor electrode layer formed in the first sensor electrode cover sheet 170 and a second sensor electrode layer formed in the film layer 150 and of forming a predetermined gap. In this case, in order to sustain visibility of the display panel 120, the first adhesive layer 160 is made of an OCA material or an SVR material.

The film layer 150 is disposed between the first sensor electrode cover sheet 170 and the first adhesive layer 160 to be opposite to the first sensor electrode layer formed in the first sensor electrode cover sheet 170 and functions as a capacitance sensor. The film layer 150 is formed with an ITO film and more particularly, the film layer 150 is formed in a pattern of an ITO thin film on a PET film.

The second adhesive layer 131 is disposed between the film layer 150 and the display panel 120 to perform a function of fixing the film layer 150 to the display panel 120. Further, the second adhesive layer 131 performs a function of removing an air layer that may structurally occur between the film layer 150 and the display panel 120 and is formed with a transparent adhesive material, for example an OCA or SVR material in order to increase visibility of the display panel 120. That is, the second adhesive layer 131 is made of the same material as that of the first adhesive layer 160 and may be provided in a solid type as well as a liquid type and may be cured according to thermosetting.

Figure 5:
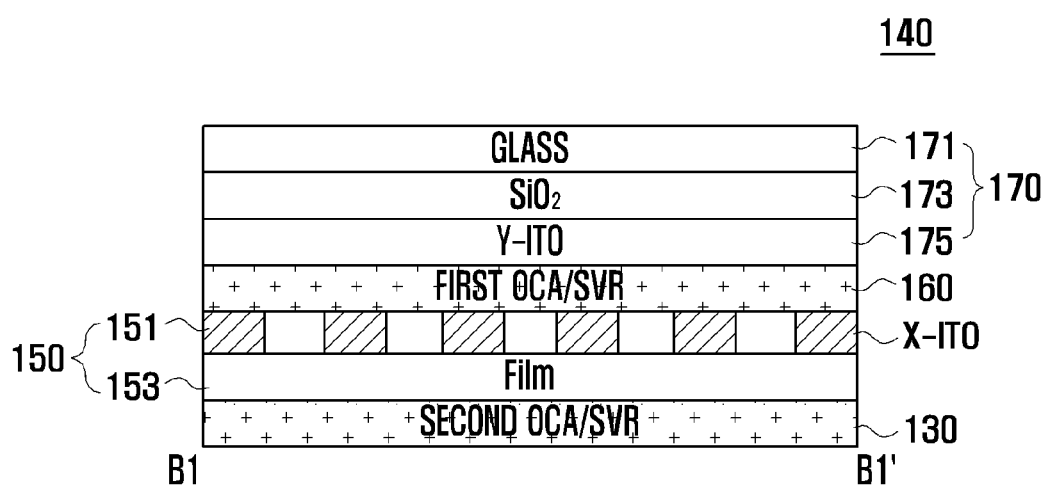
FIG. 5 is a cross-sectional view illustrating the touch panel structure taken along line B1-B1' of FIG. 4 according to an exemplary embodiment of the present invention.

FIG. 5 is a cross-sectional view illustrating the touch panel structure taken along line B1-B1' of FIG. 4 according to an exemplary embodiment of the present invention.

Referring to FIG. 5, the slim type touch panel 140 disposed at the mobile terminal 100 includes an upper substrate 171 (GLASS), an insulating layer (SiO$_2$) 173, a first sensor electrode layer (Y-ITO) 175, a first adhesive layer 160, a second sensor electrode layer (X-ITO) 151, and a film 153. The mobile terminal 100 has the second adhesive layer 131 for attaching the slim type touch panel 140 to the display panel 120.

As shown in FIG. 3, the upper substrate 171 is formed with PC of a transparent material, for example, a glass material or a plastic material. More particularly, the upper substrate 171 may be formed with tempered glass reinforced with glass of a predetermined characteristic. The upper substrate 171 performs a function of a substrate in which the first sensor electrode layer 175 is formed.

The insulating layer 173 protects a surface of the upper substrate 171 while sustaining visibility of the display panel 120. For this purpose, the insulating layer 173 is formed with transparent porous SiO$_2$. The insulating layer 173 may be omitted according to a characteristic of the upper substrate 171. That is, the insulating layer 173 is removed and the first sensor electrode layer 175 may be directly formed on the upper substrate 171.

The first sensor electrode layer 175 is formed by a patterning operation on a surface of the upper substrate 171 or on the insulating layer 173. In order to sustain visibility of the display panel 120, the first sensor electrode layer 175 is formed with an electrode of a transparent material, for example ITO. The first sensor electrode layer 175 formed with ITO has a sensor electrode pattern through a process of ITO application and etching. More particularly, in order to more efficiently detect a capacitance change with a capacitive method, the first sensor electrode layer 175 is used as a Y electrode. Here, the Y electrode may be a change signal output electrode of electric charges distributed in a gap formed between the first sensor electrode layer 175 and the second sensor electrode layer 151.

The slim type touch panel 140 forms the first sensor electrode layer 175 and disposes a transparent protective layer on the first sensor electrode layer 175 by performing a laminating process for scattering prevention and protection of the first sensor electrode layer 175. In this case, the first adhesive layer 160 is disposed at a lower part of the transparent protective layer. The transparent protective layer may be replaced with the first adhesive layer 160 in the laminating process. Therefore, the slim type touch panel 140 may be manufactured in an integral form including the upper substrate 171, first sensor electrode layer 175, and transparent protective layer, or may be manufactured in an integral form including the upper substrate 171, first sensor electrode layer 175, and first adhesive layer 160, according to a manufacturing method. The transparent protective layer or the transparent protective layer and the first adhesive layer 160 perform a function of preventing a short circuit of the second sensor electrode layer 151 formed in the first sensor electrode cover sheet 170 and the film layer 150.

The second sensor electrode layer 151 is formed on the film 153 to be disposed to have a predetermined gap from the first sensor electrode layer 175 and the first adhesive layer 160. In order to sustain visibility of the display panel 120, similarly to the first sensor electrode layer 175, the second sensor electrode layer 151 is formed with an ITO thin film, which is a transparent electrode material. The second sensor electrode layer 151 performs a function as an X electrode, unlike the first sensor electrode layer 175. That is, electric charges are injected into the second sensor electrode layer 151 having a gap from the second sensor electrode layer 151 and thus the second sensor electrode layer 151 may be a charge input electrode that performs a function as a capacitance touch sensor.

The film 153 performs a function of a substrate in which the second sensor electrode layer 151 is formed in a thin film. The film 153 may be integrally formed with the second sensor electrode layer 151. The film 153 is formed with various transparent materials such as plastic or PET.

As described above, the second adhesive layer 131 is disposed at a lower part of the film layer 150 to perform a function of fixing the film layer 150 to the display panel 120, and the second adhesive layer 131 is disposed at a lower part of the film layer 150 to be integrally formed with the film layer 150.

As described above, the slim type touch panel 140 according to another exemplary embodiment of the present invention forms the first sensor electrode layer 175 on a cover sheet for protecting the touch panel 140 and thus a portion of an ITO film layer used for disposing a sensor electrode layer may be removed. Accordingly, the slim type touch panel 140 according to the present exemplary embodiment provides the touch panel 140 having a thickness less than that of a conventional touch panel. The slim type touch panel 140 according to the present exemplary embodiment provides the first adhesive layer 160 having excellent transmittance and visibility between the first sensor electrode layer 175 and the second sensor electrode layer 151, thereby improving a light characteristic between the first sensor electrode layer 175 and the second sensor electrode layer 151. The slim type touch panel 140 according to the present exemplary embodiment provides the second adhesive layer 131 between the film layer 150 and the display panel 120, similarly to the slim type touch panel according to the foregoing exemplary embodiment and thus an air layer that structurally deteriorates a light characteristic may not be formed.

Figure 6:
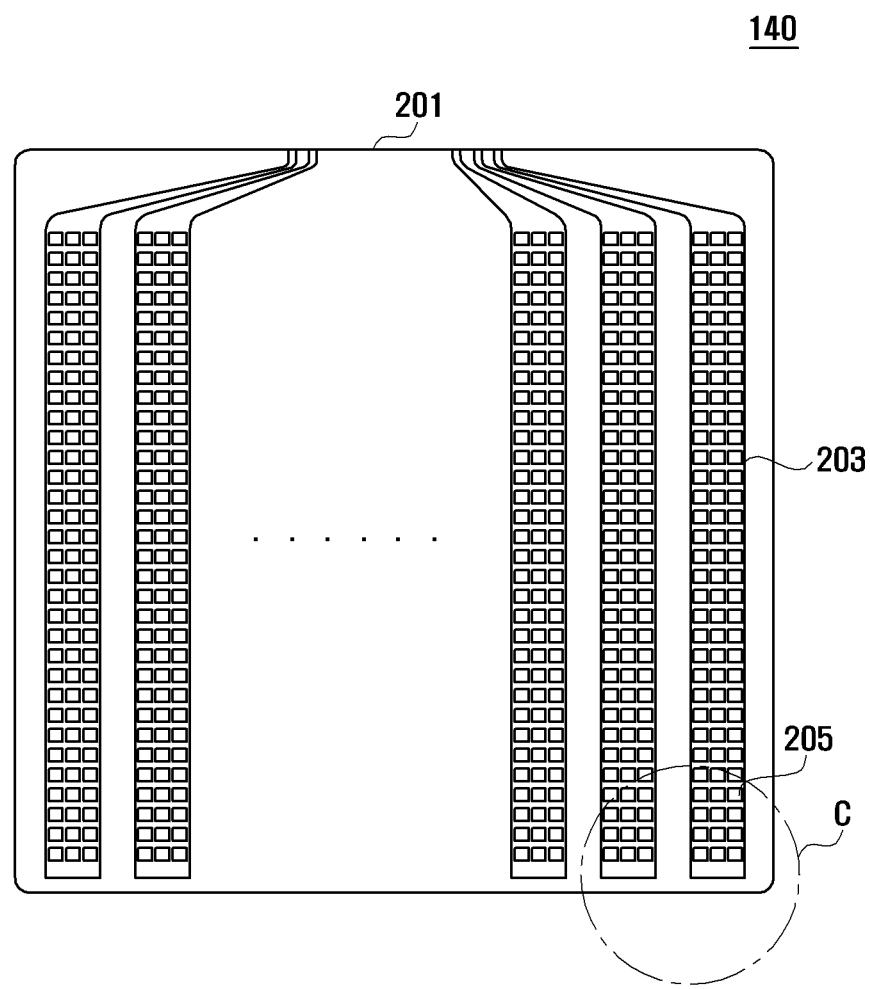
FIG. 6 is a diagram illustrating a sensor electrode layer pattern applied to a touch panel according to an exemplary embodiment of the present invention.
Figure 7:
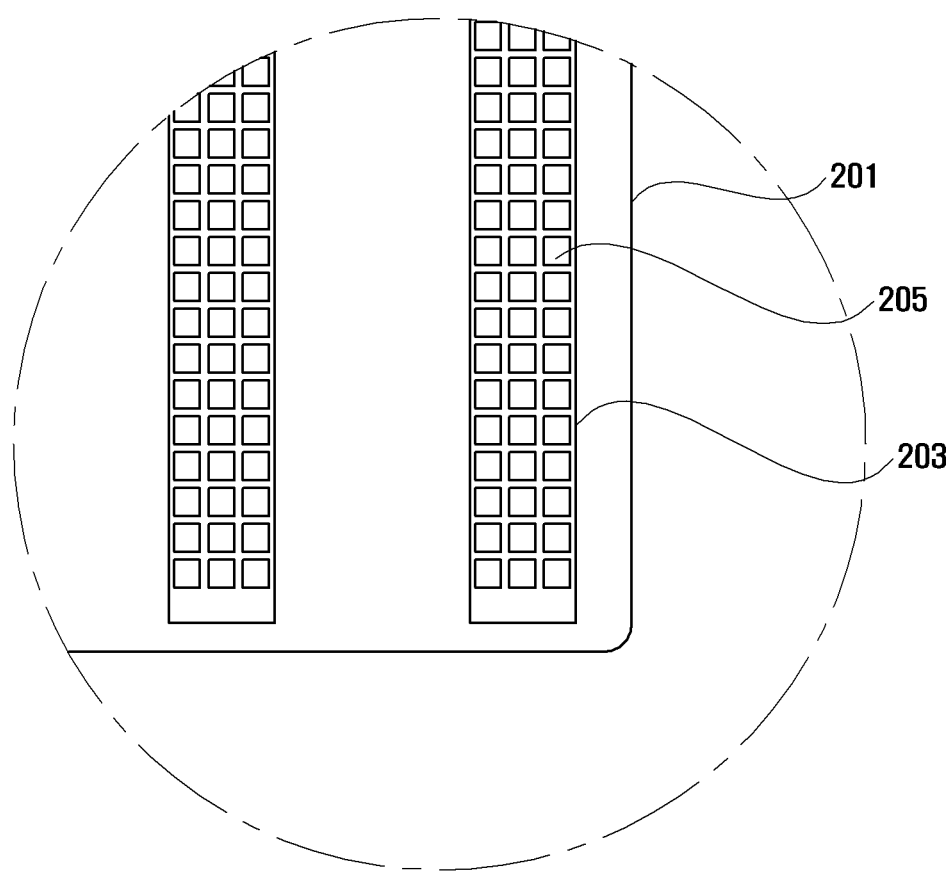
FIG. 7 is an enlarged view illustrating an area "C" of FIG. 6 according to an exemplary embodiment of the present invention.

FIG. 6 is a diagram illustrating a sensor electrode layer pattern applied to a touch panel according to an exemplary embodiment of the present invention, and FIG. 7 is an enlarged view illustrating an area "C" of FIG. 6 according to an exemplary embodiment of the present invention.

In the following description, in order to more clearly describe a structure of the sensor electrode layer, only one of the first sensor electrode layer or the second sensor electrode layer formed on an upper substrate 201 is described. A description of other structures included in the slim type touch panel 140 is omitted. Accordingly, a sensor electrode layer to be described later may be at least one of the first sensor electrode layer and the second sensor electrode layer described in the foregoing exemplary embodiment and the present exemplary embodiment.

Referring to FIGS. 6 and 7, a sensor electrode layer 203 formed on the upper substrate 201 includes a plurality of sensor electrode lines. In this case, in each sensor electrode line of the sensor electrode layer 203, a dummy pattern 205 including at least one hole penetrating the inside is formed. The dummy pattern 205 has a structure for improving a light transmittance of the sensor electrode layer 203 of a transparent material and has a structure for preventing a pattern of the sensor electrode layer 203 from being exposed from the outside. In more detail, even if an ITO electrode forming the sensor electrode layer 203 is formed with a transparent material, a light characteristic may be deteriorated. Accordingly, an area in which the sensor electrode layer 203 is formed may represent a light characteristic distinguished from an area in which the sensor electrode layer 203 is not formed. Accordingly, in order to improve a light characteristic, the slim type touch panel 140 forms a dummy pattern 205 for preventing an electrode from being partially formed within each electrode line having a predetermined width of the sensor electrode layer 203.

The upper substrate 201 may be formed with the same glass material, glass PC material, and PC material as that of an upper substrate of the foregoing exemplary embodiments. More particularly, the upper substrate 201 may be formed with a tempered glass material. Before the sensor electrode layer 203 is formed, the above-described insulating layer may be formed at a front surface of the upper substrate 201 or may be omitted. ITO, which is an electrode of a transparent material, is applied on the upper substrate 201. After the ITO is applied, a photoresist is formed on an ITO thin film. When a photoresist layer is formed, an exposure process is performed using a film having the dummy pattern 205 and a pattern of the sensor electrode layer 203. After an exposure process, the sensor electrode layer 203 having the dummy pattern 205 is formed through an etching process.

When the first sensor electrode layer and the second sensor electrode layer are formed, as described above, the sensor electrode layers 203 having the dummy pattern 205 are each formed and thus a higher light transmission characteristic and exposure prevention of a sensor electrode pattern can be improved. Because a process of forming and patterning the ITO thin film may be performed in a chamber of a high temperature, it is preferable that the process is used only when forming the sensor electrode layer 203 in the upper substrate 201 that can endure a high temperature environment. Therefore, in the slim type touch panel 140 according to an exemplary embodiment of the present invention, because both the first sensor electrode layer 145 and the second sensor electrode layer 149 are formed on the upper substrate 141, the sensor electrode layer 203 having the dummy pattern 205 can be selectively applied to both or at least one of the first sensor electrode layer 145 and the second sensor electrode layer 149.

The slim type touch panel 140 according to another exemplary embodiment of the present invention has a structure in which the second sensor electrode layer 151 is included in the film layer 150, and the film 153 included in the film layer 150 is formed with a PET material that may be a limitation when operating in a high temperature environment. Accordingly, in the slim type touch panel 140 according to another exemplary embodiment of the present invention, the sensor electrode layer 203 having the dummy pattern 205 may be formed only in the first sensor electrode layer 175.

Figure 8:
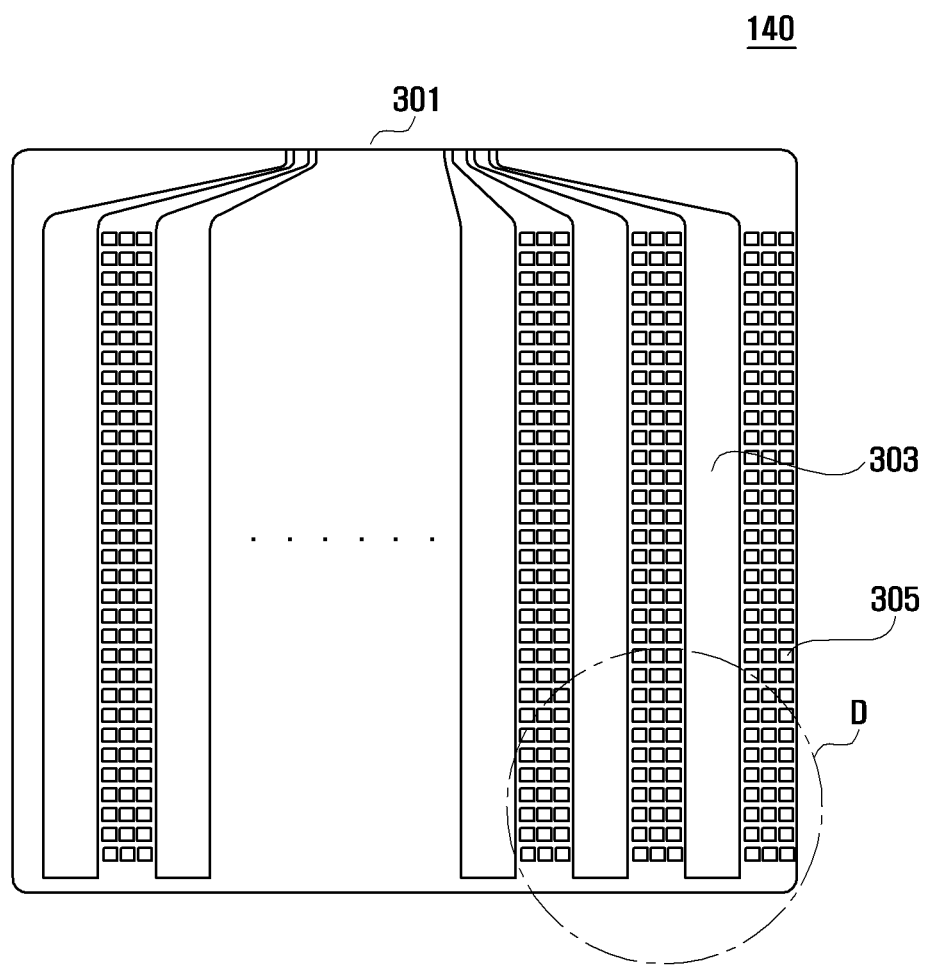
FIG. 8 is a diagram illustrating a dummy pattern layer applied to a touch panel according to an exemplary embodiment of the present invention.
Figure 9:
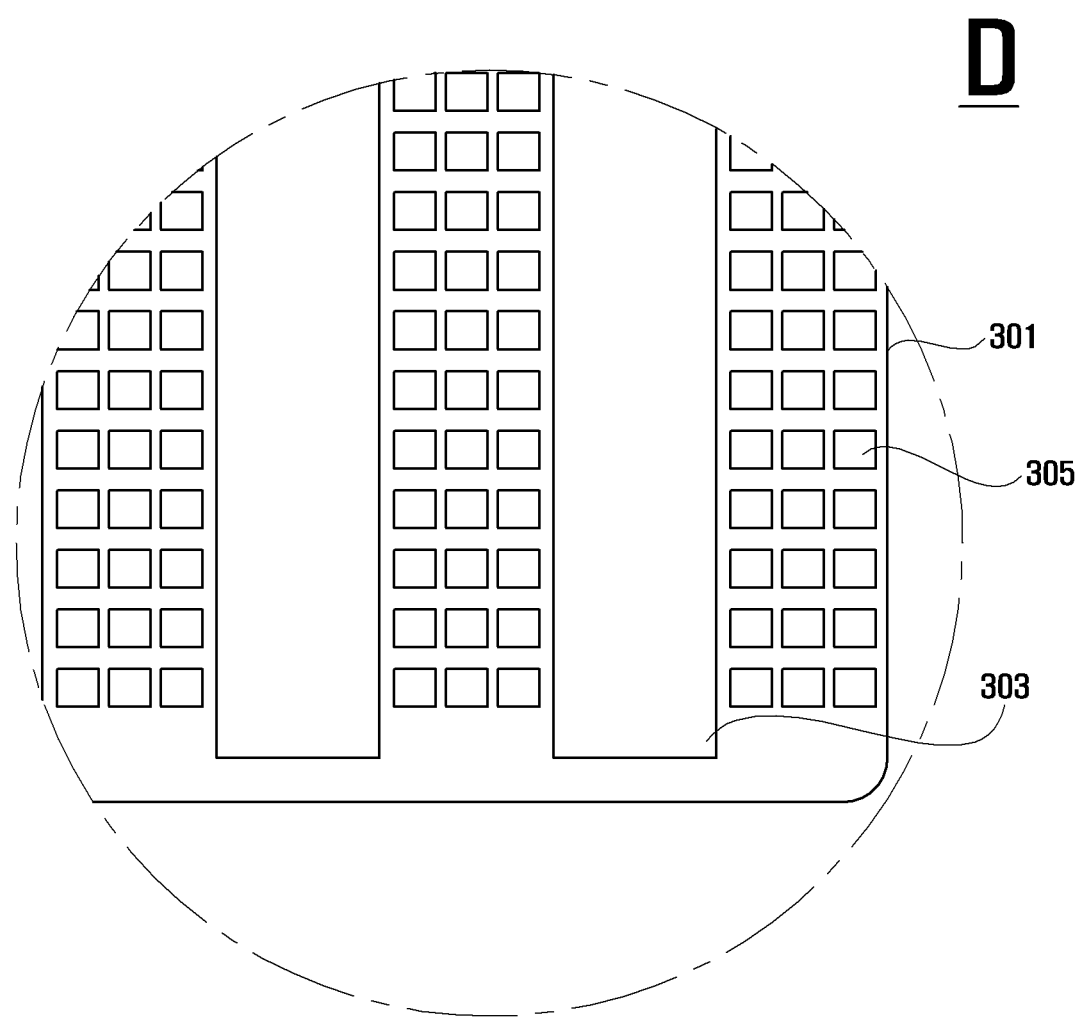
FIG. 9 is an enlarged view illustrating an area "D" of FIG. 8 according to an exemplary embodiment of the present invention.

FIG. 8 is a diagram illustrating a dummy pattern layer applied to a touch panel according to an exemplary embodiment of the present invention, and FIG. 9 is an enlarged view illustrating an area "D" of FIG. 8 according to an exemplary embodiment of the present invention.

In the following description, as shown in FIGS. 6 and 7, in order to describe a structure on a sensor electrode layer, a detailed description of other elements of the touch panel 140 is omitted.

Referring to FIGS. 8 and 9, the slim type touch panel 140 includes an upper substrate 301, a sensor electrode layer 303 for performing a function of a capacitance sensor, and a dummy pattern layer 305 for improving a reflectivity.

When the sensor electrode layer 303 is formed with an ITO material as a transparent material such as a tempered glass material on the upper substrate 301, a step portion is formed and structurally different reflectivity may occur between an upper substrate area in which the sensor electrode layer 303 is formed and an upper substrate area in which the sensor electrode layer 303 is not formed. That is, during transmission of light from the inside and outside of the slim type touch panel 140, light that transmits an area in which the upper substrate 301 and the sensor electrode layer 303 are formed and light that transmits an area in which the sensor electrode layer 303 is not formed transmits through different material layers and thus a difference in reflectivity may occur. As a result, in the slim type touch panel 140 in which only the sensor electrode layer 303 is formed, a pattern of the sensor electrode layer 303 can be easily determined by the naked eye from the outside due to a reflectivity difference between an area in which the sensor electrode layer 303 is formed and an area in which the sensor electrode layer 303 is not formed. A problem of such pattern recognition has an influence on an image output from the display panel and thus a problem in visibility may occur.

Therefore, the slim type touch panel 140 according to the present exemplary embodiment includes the dummy pattern layer 305 of an ITO material in an area in which the sensor electrode layer 303 is not formed (i.e., in an area between sensor electrode lines). Here, the dummy pattern layer 305 is formed not to contact with the sensor electrode lines. In order to detect a signal change according to a touch, the sensor electrode lines are connected to separate signal lines, for example, to Flexible Printed Circuit (FPC) lines connected to the controller. However, in the ITO electrode pattern formed in the dummy pattern layer 305, a separately connected signal line is not formed, unlike sensor electrode lines.

In short, in order to prevent degradation of visibility by the sensor electrode layer 203, the slim type touch panel 140 according to the present exemplary embodiment forms the dummy pattern 205 of a perforated form in the sensor electrode layer 203, as shown in FIGS. 6 and 7, or forms a dummy pattern layer 305 of the same material as that of the sensor electrode layer 303 in an upper substrate area in which the sensor electrode layer 303 is not formed, as shown in FIGS. 8 and 9, thereby improving a light characteristic. Further, the slim type touch panel 140 according to the present exemplary embodiment may use a structure in which both the dummy pattern 205 and the dummy pattern layer 305 are formed. A hole shape of the dummy pattern 205 and a pattern cell shape of the dummy pattern layer 305 are shown in a quadrangular shape. However, the present invention is not limited thereto and may have a shape such as a triangle, a hexagon, an oval, and the like.

In the foregoing description, a shape of the dummy pattern 205 is shown in a matrix form. However, the present invention is not limited thereto. That is, the dummy pattern 205 may be formed in at least one stripe form having a predetermined width on a predetermined area of electrode lines included in the sensor electrode layer 203. Here, as described above, the dummy pattern 205 of a stripe form may be formed in a hole shape of a stripe form that penetrates an electrode line.

Figure 10:
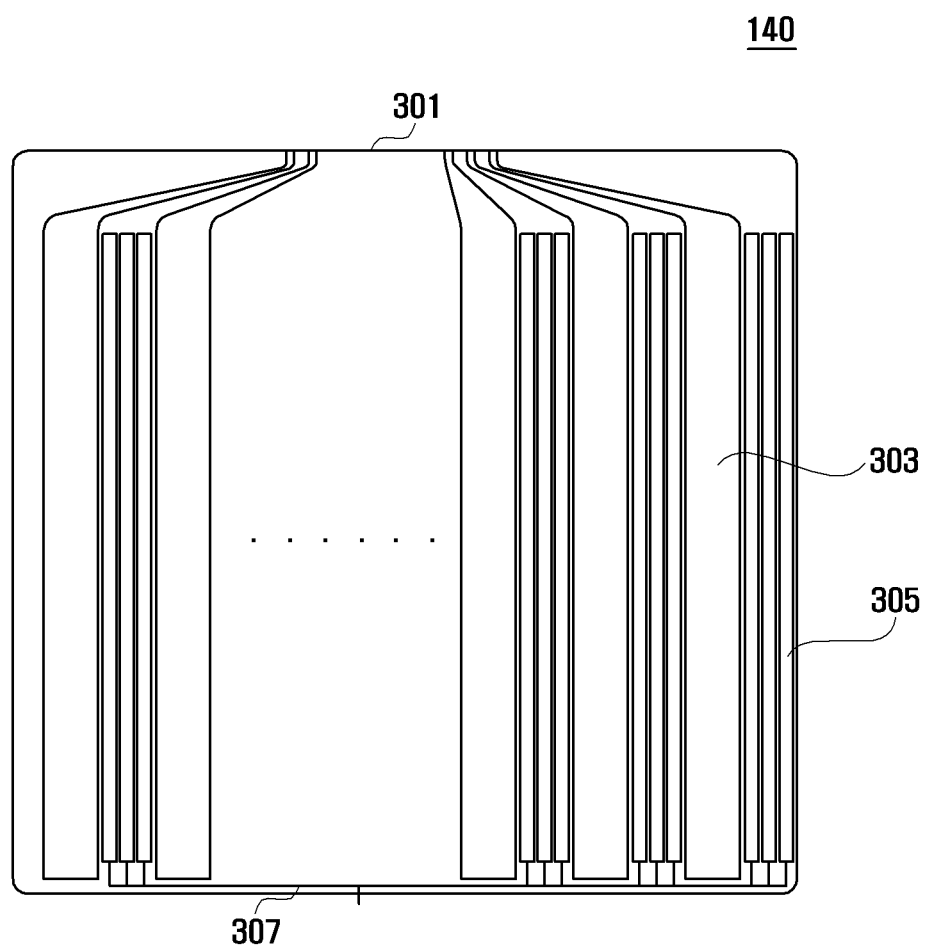
FIG. 10 is a diagram illustrating another form of a dummy pattern layer and operation of an antenna pattern according to an exemplary embodiment of the present invention.

FIG. 10 is a diagram illustrating another form of a dummy pattern layer and operation of an antenna pattern according to an exemplary embodiment of the present invention.

Referring to FIG. 10, the dummy pattern layer 305 may be formed in a stripe form. In this case, the dummy pattern layer 305 may be formed as an antenna pattern. In more detail, the dummy pattern layer 305 and the signal lines 307 may further include the dummy pattern layer 305 formed in a predetermined width and length on the upper substrate 301 and the signal lines 307 for connecting the dummy pattern layers 305, and the signal lines 307 may be connected to a Radio Frequency (RF) unit of the mobile terminal 100. Accordingly, the dummy pattern layer 305 is disposed to perform an antenna function of the mobile terminal 100. In the foregoing description, the signal lines 307 connect all dummy pattern layers 305 of an entire stripe shape. However, the present invention is not limited thereto. For example, by connecting only some of the dummy pattern layers 305 of a stripe shape with the signal lines 307, some dummy pattern layers 305 can be used as an antenna pattern. Substantially, because the dummy pattern layer 305 is disposed at a front surface of the touch panel 140, when using the entire dummy pattern layers 305 as an antenna pattern, electric field interference may occur due to the adjacent sensor electrode layer 303. Accordingly, the dummy pattern layer 305 positioned at the edge of the dummy pattern layer 305 or only some dummy pattern layers 305 may be used as an antenna pattern. Accordingly, the signal lines 307 perform a function of transmitting an antenna signal by the control of the controller.

When the dummy pattern layer 305 of a stripe shape is not used as an antenna pattern, the dummy pattern layer 305 may be formed vertically or parallel to a direction of electrode lines formed in the sensor electrode layer 303 and may be formed in a predetermined angle regardless of a direction of electrode lines according to a manufacturing method.

As described above, in the slim type touch panel 140 and the mobile terminal 100 including the same according to an exemplary embodiment of the present invention, at least one sensor electrode layer is formed on a cover sheet used for protecting a touch panel, and thus a touch panel having a smaller thickness can be provided, compared with a conventional case of using an ITO film layer. And, by manufacturing in an integral form in a production process, a mass production can be more easily performed and an assembly process with a display panel can be more easily performed. Further, by providing an adhesive layer on the slim type touch panel 140 and the display panel 120, an air layer occurring in a coupling process of the touch panel and the display panel can be removed and thus an improved light characteristic can be provided.

In a slim type touch panel and a mobile terminal including the same according to an exemplary embodiment of the present invention, a touch panel can be formed having a reduced thickness, and, while improving an optical characteristic of the touch panel, an improved optical characteristic can be provided in a process of disposing a display panel.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal comprising a slim type touch panel, the mobile terminal comprising:
   a first sensor electrode cover sheet in which a first sensor electrode layer is patterned, the first sensor electrode cover sheet comprising:
      an upper substrate,
      a first sensor electrode layer patterned in a lower part of the upper substrate, and
      a transparent protective layer disposed at a lower part of the first sensor electrode layer;
   a first adhesive layer disposed at a lower part of the first sensor electrode cover sheet, the first adhesive layer being formed with an adhesive material supporting an adhesive function;
   a film layer disposed at a lower part of the first adhesive layer and comprising a second sensor electrode layer;
   a second adhesive layer disposed at a lower part of the film layer;
   a display panel disposed at a lower part of the second adhesive layer; and
   a dummy pattern layer formed with a same material as that of the first sensor electrode layer in a portion of upper substrate in which the first sensor electrode layer is not formed and connected to signal lines to output an antenna signal.

2. The mobile terminal of claim 1, further comprising an insulating layer disposed between the upper substrate and the first sensor electrode layer.

3. The mobile terminal of claim 1, further comprising:
   a dummy pattern for penetrating at least one sensor electrode line comprised in the first sensor electrode layer and the second sensor electrode layer and having a plurality of holes having at least one shape of a polygon matrix, an oval matrix, and a stripe,
   wherein the dummy pattern layer has at least one shape of a polygon matrix, an oval matrix, and a stripe.

4. The mobile terminal of claim 1, wherein at least one set of the first sensor electrode cover sheet, the first adhesive layer, the film layer, and the second adhesive layer are integrally formed.

5. A slim type touch panel comprising:
   a first sensor electrode cover sheet in which a first sensor electrode layer is patterned, the first sensor electrode cover sheet comprising:
      an upper substrate;
      a first sensor electrode layer patterned in a lower part of the upper substrate; and
      a transparent protective layer disposed at a lower part of the first sensor electrode layer;
   a first adhesive layer disposed at a lower part of the first sensor electrode cover sheet, the first adhesive layer being formed with an adhesive material supporting an adhesive function; and
   a film layer disposed at a lower part of the first adhesive layer and comprising a second sensor electrode layer; and
   a dummy pattern layer formed with a same material as that of the first sensor electrode layer in a portion of upper substrate in which the first sensor electrode layer is not formed and connected to signal lines to output an antenna signal.

6. The slim type touch panel of claim 5, further comprising a second adhesive layer disposed at a lower part of the film layer.

7. The slim type touch panel of claim 6, wherein the film layer and the second adhesive layer are integrally formed.

8. The slim type touch panel of claim 7, further comprising an insulating layer disposed between the upper substrate and the first sensor electrode layer.

9. The slim type touch panel of claim 7, further comprising:
   a dummy pattern for penetrating at least one sensor electrode line comprised in the first sensor electrode layer and having a plurality of holes having at least one shape of a polygon matrix, an oval matrix, and a stripe,
   wherein the dummy pattern has at least one shape of a polygon matrix, an oval matrix, and a stripe.

10. The slim type touch panel of claim 5, wherein the first sensor electrode cover sheet and the first adhesive layer are integrally formed.

11. A mobile terminal comprising a slim type touch panel, the mobile terminal comprising:
    a first sensor electrode cover sheet in which a first sensor electrode layer is patterned and comprising an upper substrate;
    a first adhesive layer disposed at a lower part of the first sensor electrode cover sheet, the first adhesive layer being formed with an adhesive material supporting an adhesive function;
    a film layer disposed at a lower part of the first adhesive layer and comprising a second sensor electrode layer;
    a second adhesive layer disposed at a lower part of the film layer;
    a display panel disposed at a lower part of the second adhesive layer; and
    a dummy pattern layer formed with a same material as that of the first sensor electrode layer in a portion of upper substrate in which the first sensor electrode layer is not formed and connected to signal lines to output an antenna signal.

* * * * *